United States Patent [19]
Maeda

[11] Patent Number: 5,513,208
[45] Date of Patent: Apr. 30, 1996

[54] FACSIMILE APPARATUS AND TRAINING SEQUENCE CHANGEOVER METHOD

[75] Inventor: Toru Maeda, Yokohama, Japan

[73] Assignee: Canon Kabushiki Kaisha, Tokyo, Japan

[21] Appl. No.: 127,473

[22] Filed: Sep. 28, 1993

Related U.S. Application Data

[63] Continuation of Ser. No. 46,390, Apr. 9, 1993, abandoned, which is a continuation of Ser. No. 460,255, Jan. 2, 1990, abandoned.

[30] Foreign Application Priority Data

Jan. 12, 1989 [JP] Japan .......................... 1-3858

[51] Int. Cl.$^6$ ........................................... H03H 7/30
[52] U.S. Cl. ......................... 375/231; 375/223; 358/436
[58] Field of Search .................. 379/100, 93, 97; 375/8, 121, 13, 109, 10; 358/435, 436, 434, 412, 405, 439; 371/32; H04N 1/00

[56] References Cited

U.S. PATENT DOCUMENTS

| | | |
|---|---|---|
| 3,535,439 | 10/1970 | Matthews et al. ............... 358/436 |
| 4,153,916 | 5/1979 | Miwa et al. ..................... 358/439 |
| 4,663,766 | 5/1987 | Bremer . |
| 4,710,925 | 12/1987 | Negi ............................. 371/5.5 |
| 4,773,080 | 9/1988 | Nakajima et al. ................ 375/8 |
| 4,829,524 | 5/1989 | Yoshida ......................... 371/32 |
| 4,850,008 | 7/1989 | Berg et al. ................... 379/100 X |
| 4,885,755 | 12/1989 | Yoshida ......................... 375/58 |
| 4,956,851 | 9/1990 | Wolensky et al. ................ 375/8 |
| 4,999,716 | 3/1991 | Nakamura ................... 358/435 X |
| 5,031,179 | 7/1991 | Yoshida et al. ................ 371/32 |
| 5,075,583 | 12/1991 | Yoshida et al. ............... 358/439 |

*Primary Examiner*—Stephen Chin
*Assistant Examiner*—Tesfaldet Bocure
*Attorney, Agent, or Firm*—Fitzpatrick, Cella, Harper & Scinto

[57] ABSTRACT

A facsimile apparatus determines whether a frame to be transmitted is an image block or an error retransmission frame, and transmits a short training sequence or a long training sequence based on the results of the determination. The long training sequence is sent if a TCF signal is transmitted and the short training sequence is sent if the image block is transmitted. If the facsimile apparatus is on the receiving side, a training sequence in accordance with the frame from the transmitting side is received. After a carrier signal is detected, the apparatus then makes a transition to a mode for receiving the TCF signal or image block.

20 Claims, 7 Drawing Sheets

|  | SEGMENT 1 | SEGMENT 2 TRN | SEGMENT 3 | SEGMENT 4 | TOTAL |
|---|---|---|---|---|---|
| LINE SIGNAL STATUS | ABAB ALTERNATION | EQUALIZER ADJUSTMENT PATTERN | SPEED INFORMATION SEQUENCE | SCRAMBLED BINARY "1" | TOTAL TIME OF SYNCHRONIZING SIGNAL |
| SYMBOL TIME COUNT | 256 | 2976 | 64 | 48 | 3344 |
| ROUGH ESTIMATION TIME (ms) | 106 | 1240 | 27 | 20 | 1393 |

FIG. 3    V.33 MODEM LONG TRAINING SEQUENCE

|  | SEGMENT 1 | SEGMENT 2 TRN | SEGMENT 3 | SEGMENT 4 | TOTAL |
|---|---|---|---|---|---|
| LINE SIGNAL STATUS | ABAB ALTERNATION | EQUALIZER ADJUSTMENT PATTERN | SPEED INFORMATION SEQUENCE | SCRAMBLED BINARY "1" | TOTAL TIME OF SYNCHRONIZING SIGNAL |
| SYMBOL TIME COUNT | 256 | 38 | 0 | 48 | 342 |
| ROUGH ESTIMATION TIME (ms) | 106.7 | 15.8 | 0 | 20 | 142.5 |

FIG. 4   SHORT TRAINING SEQUENCE CORRESPONDING TO V.33 MODEM

FACSIMILE APPARATUS AND TRAINING SEQUENCE CHANGEOVER METHOD

This application is a continuation of application Ser. No. 08/046,390, filed on Apr. 9, 1993, which is a continuation of application Ser. No. 07/460,255, filed on Jan. 2, 1990.

BACKGROUND OF THE INVENTION

1. Field of the Invention

This invention relates to a facsimile apparatus having transmitting and receiving means for transmitting and receiving a long training sequence or a short training sequence as the training signal of a modem at the start of a data information transmission and reception and this invention also relates to a training sequence changeover method for use in the facsimile apparatus.

2. Description of the Prior Art

When transmitting an error retransmission frame or a TCF signal and an image block with an apparatus of this type, conventionally the arrangement is such that the same training signal is transmitted. For example, if transmission in a long training sequence is possible at the start of communication, then the training sequence when transmitting an image block and an error retransmission frame or TCF signal also is the same long training sequence.

However, since the operation is such that the same training sequence is transmitted as a training signal in case of the image block and error transmission frame or TCF signal in the above-described example of the prior art, the following drawbacks are encountered:

(1) When a transmission code that requires about 1393 ms is used for the training sequence, as in a modem in accordance with CCITT V.33, communication time is prolonged.

(2) When the error retransmission frame and image block are transmitted in the short training sequence, errors easily occur in the image block and, hence, an error retransmission procedure is required. Moreover, if the error retransmission frame is retransmitted, errors tend to occur in the short training sequence and a longer communication time is required.

(3) Even if an attempt is made to use a short training sequence the same as that of the image block, there is no initial tap value of the modem necessary for the short training sequence. As a consequence, the TCF signal cannot be transmitted.

SUMMARY OF THE INVENTION

The present invention seeks to provide a facsimile apparatus in which transmission time can be shortened and transmission reliability improved.

A first object of the present invention is to provide a facsimile apparatus having transmitting and receiving means for transmitting and receiving a long training sequence or a short training sequence as the training signal of a modem at the start of a data information transmission and reception, the apparatus being provided with changeover means for changing over to either the long training sequence or the short training sequence depending upon the data information.

Another object of the present invention is to provide a facsimile apparatus in which the changeover means changes over the training sequence when the data information is an error retransmission frame or an image block.

A further object of the present invention is to provide a facsimile apparatus in which the changeover means changes over the training sequence when the data information is a TCF signal or an image block.

Still a further object of the present invention is to provide a training sequence changeover method in a facsimile apparatus which transmits and receives a long training sequence or a short training sequence as a training signal of a modem at the start of transmitting and receiving a data information, the method comprises the steps of determining the kind of data information, instructing the modem to send the long training sequence or the short training sequence and the modem is instructed to change over to either the long training sequence or the short training sequence.

Other features and advantages of the present invention will be apparent from the following description taken in conjunction with the accompanying drawings.

DESCRIPTION OF THE PREFERRED EMBODIMENTS

Figure 1:
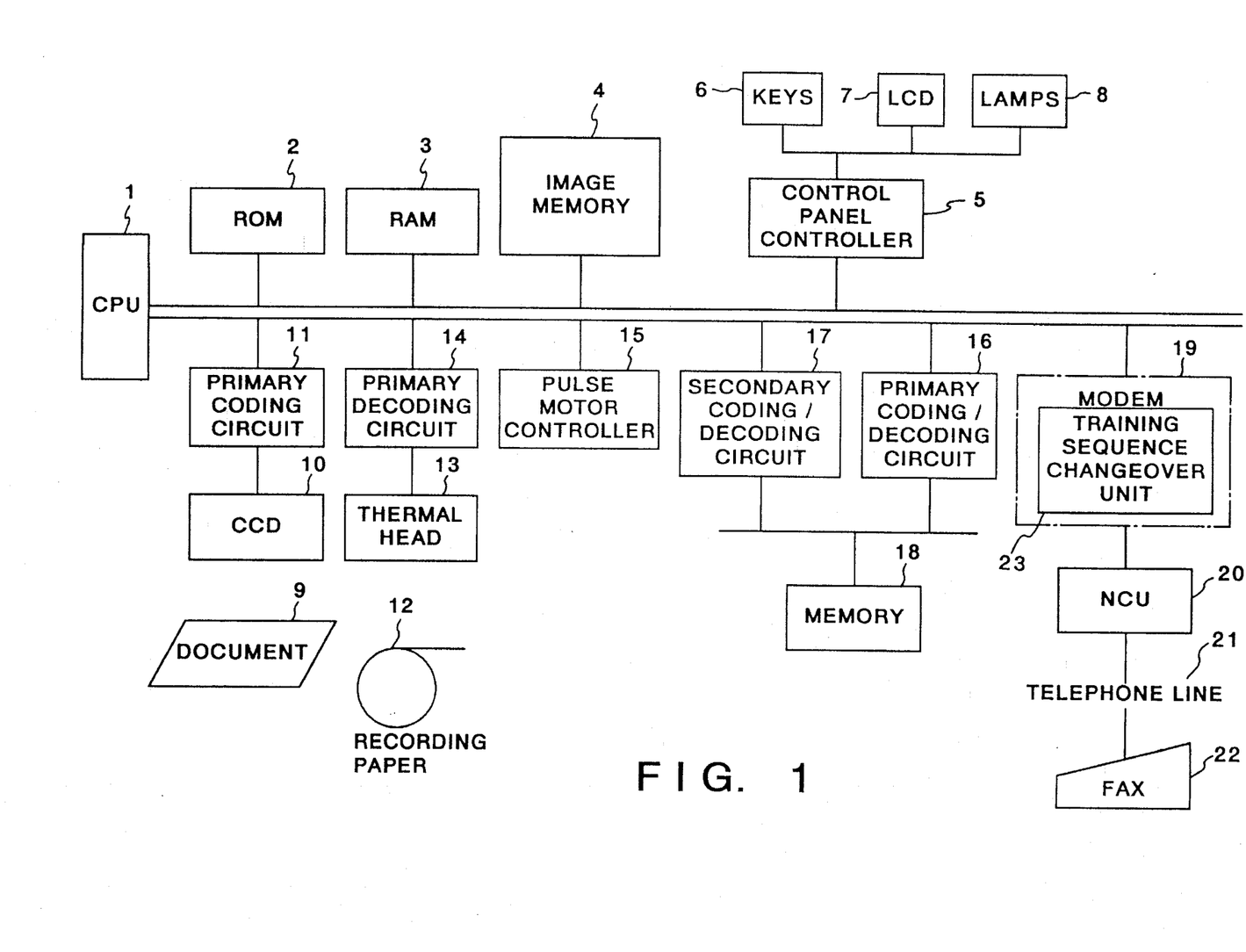
FIG. 1 is a block diagram illustrating the construction of a facsimile apparatus according to an embodiment of the present invention.

FIG. 1 is a block diagram illustrating the construction of a facsimile apparatus according to an embodiment of the present invention.

As shown in FIG. 1, the facsimile apparatus includes a CPU 1 for controlling the overall apparatus, a ROM 2 for storing the programs (described below) of the CPU 1, a RAM 3 used as a working area when the CPU 1 executes a program, an image memory 4 for storing a read image or a received image, and a control panel controller 5 for controlling control panel keys 6, an LCD 7 which presents displays for viewing by the operator, and lamps 8 for indicating operating mode and the like. Numeral 9 denotes a document, and 10 a CCD for reading the document 9. The image read by the CCD 10 is subjected to primary coding by a primary coding circuit 11.

Numeral 12 denotes recording paper for recording a received image, the image being recorded on the paper 12 by a thermal head 13. The apparatus further includes a primary decoding circuit 14 which subjects the received primary-coded data to primary decoding, a pulse motor controller 15 for controlling reading and recording motors, a primary coding/decoding circuit 16 for subjecting primary-coded data to primary coding or primary decoding, a secondary coding/decoding circuit 17 for subjecting secondary-coded data to secondary coding or secondary decoding, a memory 18 which the primary coding/decoding circuit 16 and the secondary coding/decoding circuit 17 use as a buffer, and a modem 19 for sending and receiving data information and training sequences. The modem 19 has a training sequence changeover unit 23 for changing over to either of two training sequences, namely a long training sequence and a short training sequence.

Under the control of the modem 19 which receives a command from the CPU 1, the training sequence changeover unit 23 changes over to the long training sequence or the short training sequence in dependence upon the data information. More specifically, the changeover unit 23 changes over to the long training sequence when the transmitted data information is an error retransmitted frame, to the short training sequence when the transmitted data information is an image block, and to the long training sequence when the transmitted data information is a TCF signal.

Numeral 20 denotes an NCU for performing network control between the modem 19 and a telephone line 21. Numeral 22 denotes the facsimile machine of another party.

A case will now be described in which a "MEMORY TRANSMISSION" key (not shown) on the control panel 6 in the above arrangement is operated.

First, when the document 9 to be transmitted is set in place, the control panel controller 5 is instructed so as to display a message such as "DOCUMENT IN PLACE" and the message appears on the LCD 7. Next, the destination (the receiving party's telephone number) to which the set document is to be transmitted is entered by operating the keys 6 on the control panel, whereupon the destination is written in a "DESTINATION MANAGEMENT RECORD" within the RAM 3 and registration processing is executed. When the CCD 10 is instructed to read in the document 9 and the reading operation ends, the primary coding circuit 11 is started in order to code the document into primary-coded data. When a signal indicating the end of primary coding processing enters from the started primary coding circuit 11, the primary-coded data is accumulated in the image memory 4.

In accordance with a predetermined procedure, the NCU 20 outputs, via the telephone line 21, a dialing signal for dialing the registered telephone number of the receiving party, whereby the receiving party's facsimile 22 is called. When a response is received from the receiving party, the modem 19 executes a pre-transmission procedure in accordance with a G3 procedure stipulated by the CCITT. Thereafter, when operation makes a transition to an image transmission phase, the primary-coded data stored in the image memory 4 is delivered to the primary coding/decoding circuit 16. Here the data is subjected to primary decoding to produce decoded data that is temporarily stored in the memory 18. The data stored in the memory 18 is subjected to secondary coding by the secondary coding/decoding circuit 17 to form an MR or MH code required by the receiving party's facsimile 22.

The coding of data into an MR code or MH code is well known and need not be described here.

When coding processing ends, the secondary-coded data is sent from the modem 19 to the other party's facsimile 22 via the NCU 20 and telephone line 21. When the entire transmission ends, the modem 19 executes a post-transmission procedure in accordance with the G3 procedure stipulated by the CCITT. After the post-transmission procedure, the NCU 20 restores the telephone line 21 to the disconnected state in accordance with a predetermined procedure.

Figure 2:
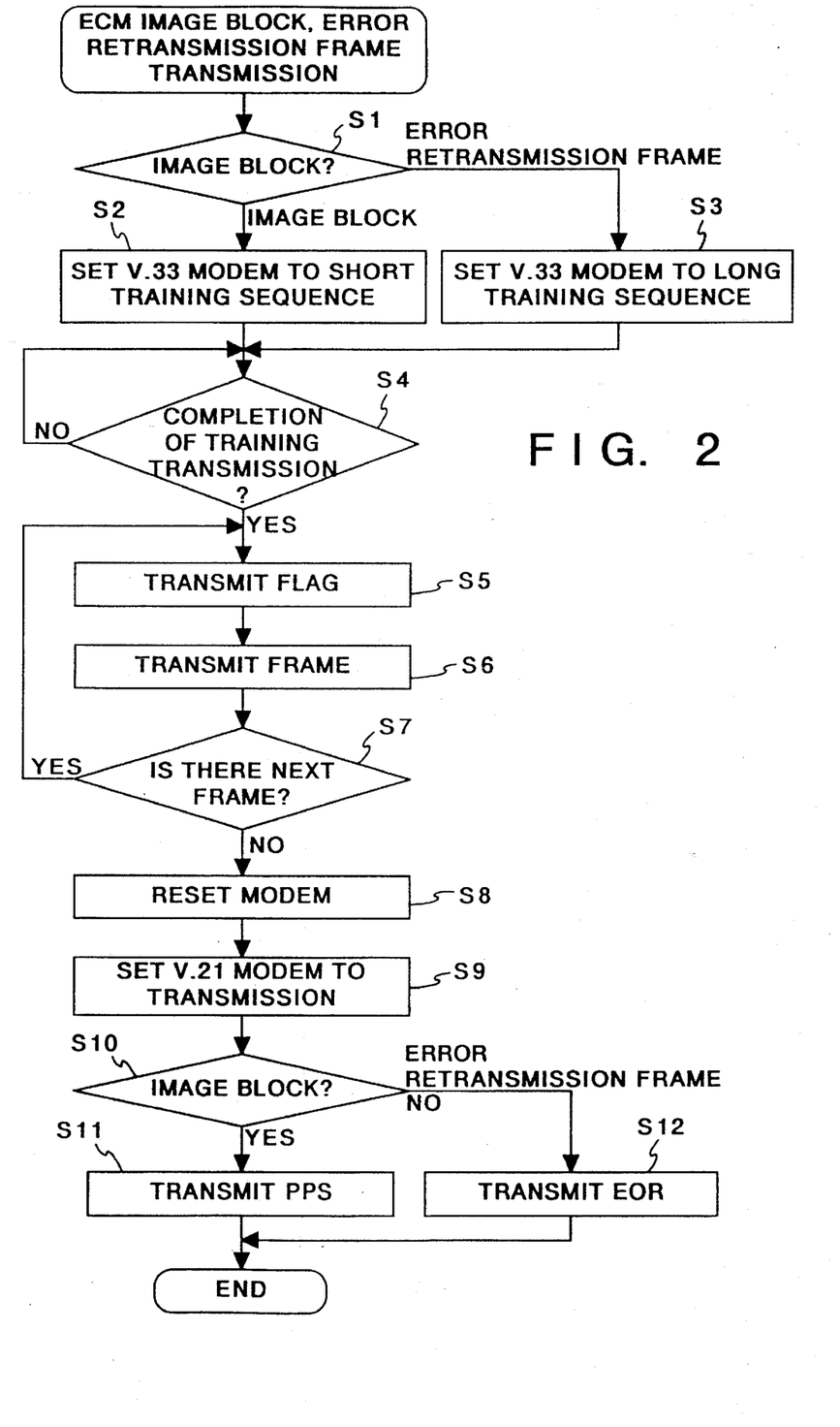
FIG. 2 is a flowchart illustrating the processing procedure of the embodiment.

A changeover procedure for effecting training sequence changeover between an image block and an error retransmission frame according to an embodiment of the invention will now be described in accordance with FIG. 2.

Step S1 of the flowchart calls for the CPU 1 to determine whether a transmitted frame of data information is an image block or a retransmission frame. An image block is a king of data information and a error retransmission frame is a second kind of data information. If the result of the determination is that the error retransmission frame is transmitted, processing proceeds to step S3, at which the CPU 1 instructs the modem 19 to send the long training sequence. If the result of the determination is that the image block is transmitted, on the other hand, then the modem 19 is instructed to send the short training sequence at step S2.

In response to receiving the training sequence transmission command from the CPU 1, the modem 19 controls its training sequence changeover unit 23 so as to effect a changeover to the long training sequence or short training sequence. The CPU 1 then waits at step S4 for the completion of training signal transmission. When a signal indicative of completion of transmission enters from the modem 19, the processing proceeds to step S5. Commands for flag transmission and transmission of all frames are issued through the processing of steps S5–S7.

Next, at step S8, the CPU 1 resets the modem 19 and then commands post-transmission processing at step S9. The CPU 1 then determines at step S10 whether the transmitted data is an image block. If it is an image block, processing proceeds to step S11, at which PPS transmission is commanded. If the data is not an image block, however, EOR transmission is commanded at step S12.

Figure 3:
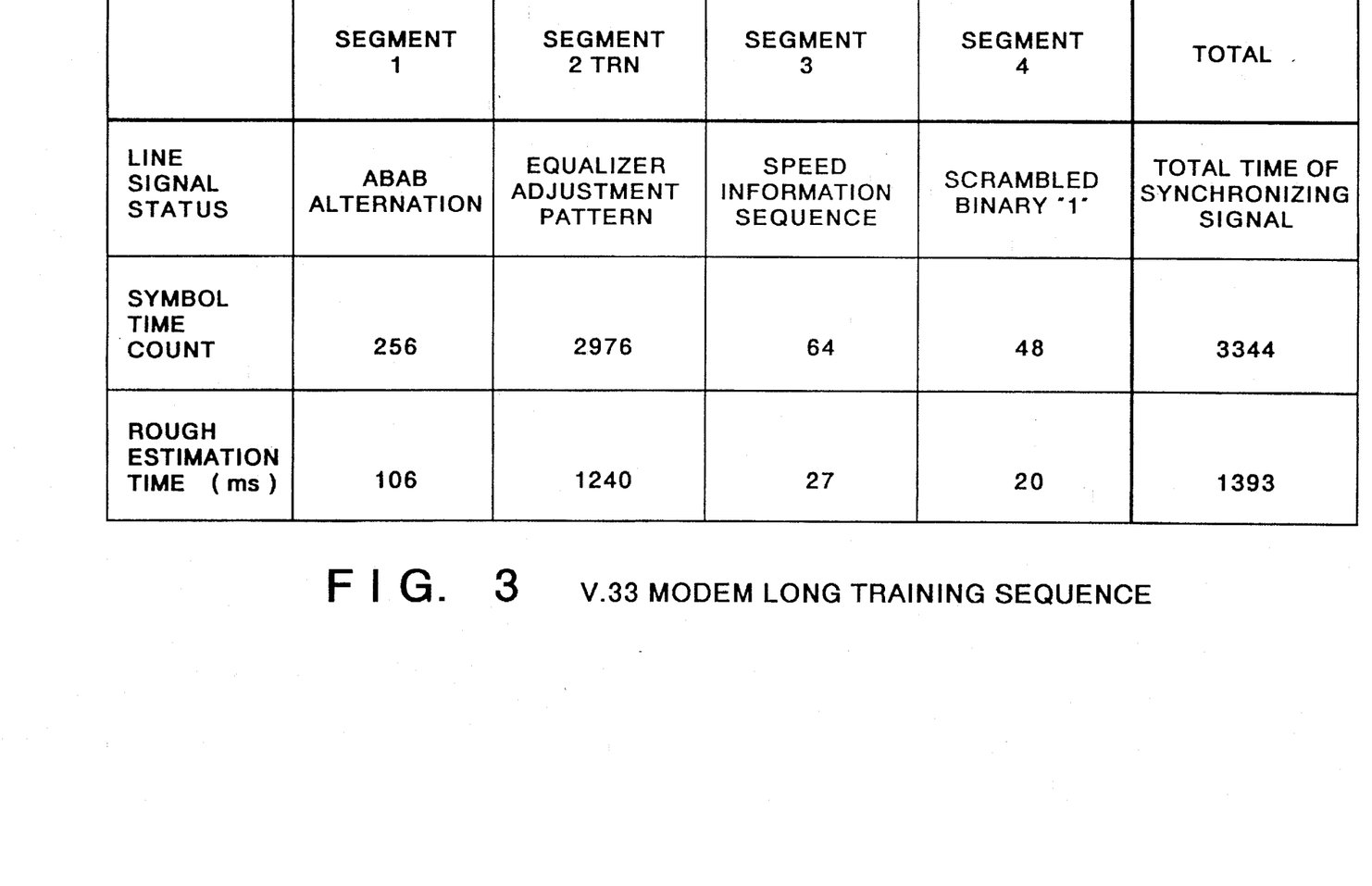
FIGS. 3 and 4 are views illustrating training sequences.
Figure 4:
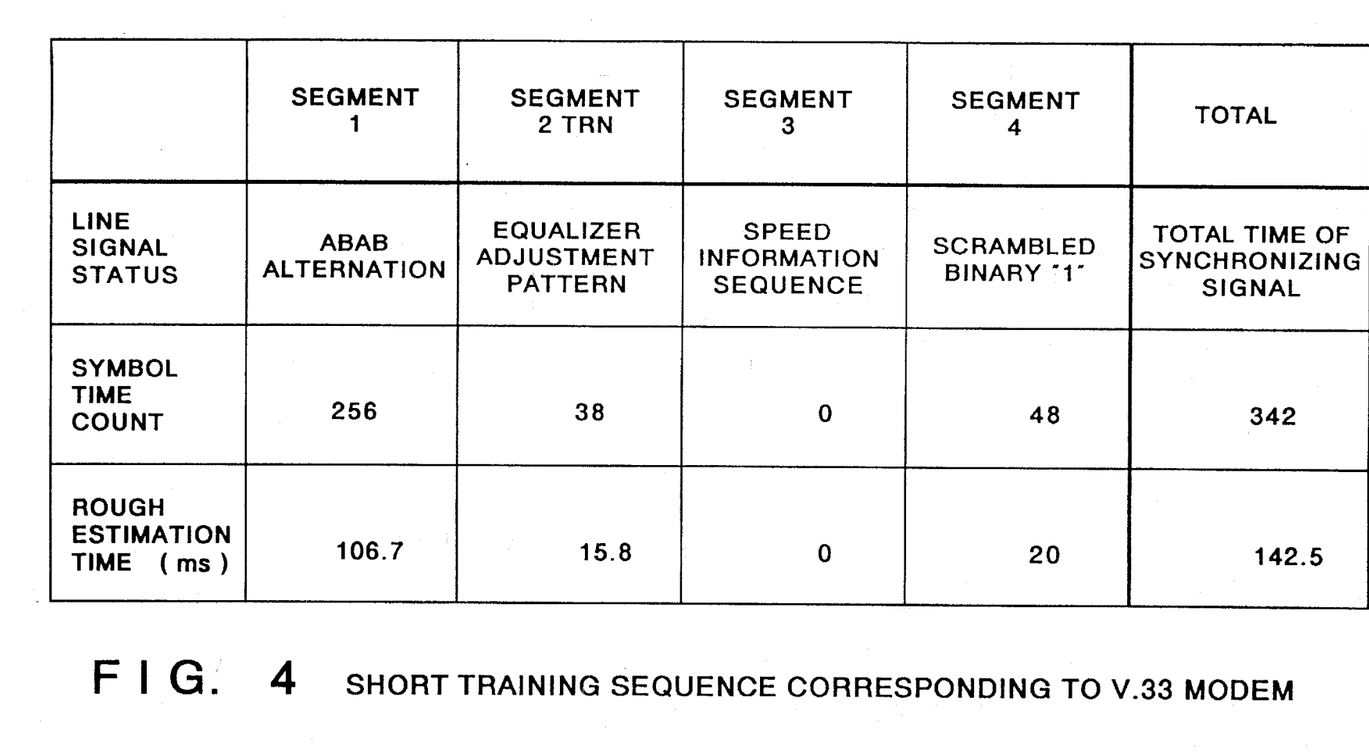

FIG. 3 illustrates a long training sequence of a CCITT V.33 modem as the training signal of the modem 19, and FIG. 4 illustrates a short training sequence corresponding to a CCITT V.33 modem as the training signal of the modem 19.

By effecting changeover between the training sequences of an image block and error retransmission frame in accordance with the present embodiment, the rate of occurrence of error in the retransmission frame can be reduced even if the state of the telephone line is poor. This makes resending of the error retransmission frame unnecessary and improves the reliability of communication. Since resending of the error retransmission frame is no longer necessary, communication time is shortened and communication cost reduced.

Though the present embodiment relates to the training sequences of a V.33 modem, it is possible to practice the present invention using a V.27ter modem as well.

DESCRIPTION OF OTHER EMBODIMENTS

Figure 5:
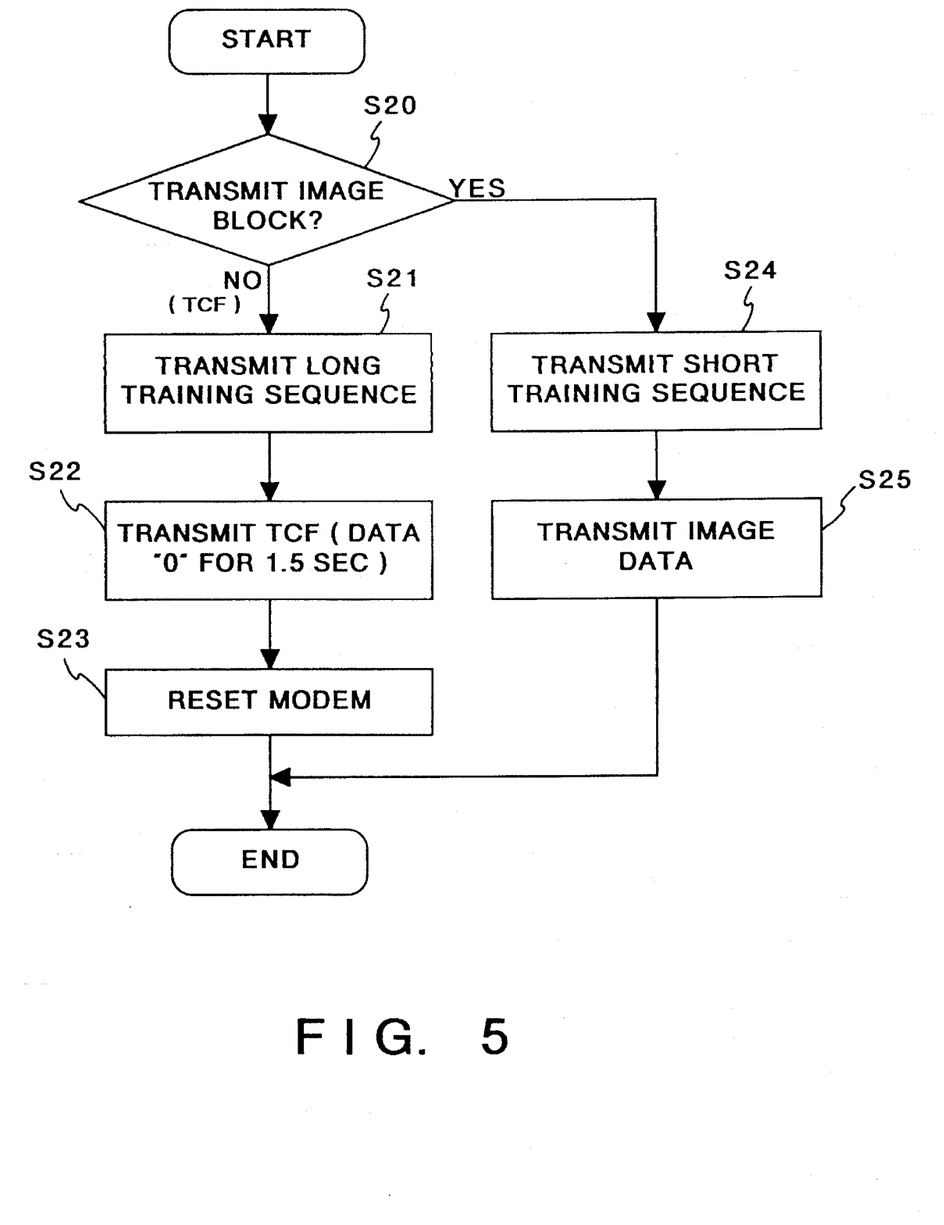
FIGS. 5 through 7 are flowcharts showing processing procedures according to another embodiment of the invention.

A changeover procedure for effecting training sequence changeover between an image block and a TCF will now be described in accordance with the flowcharts shown in FIGS. 5 through 7.

First, if a TCF signal, which is well known as a signal for checking a communication state, namely to determine whether facsimile transmission is possible, is transmitted, a NO decision is rendered by the CPU 1 at step S20, as a result of which processing proceeds to step S21. Here the modem 19 is instructed to transmit the long training sequence. The modem 19 responds by controlling its training sequence changeover unit 23 so as to transmit the long training sequence. When transmission of the long training sequence ends, transmission of the TCF signal is instructed at step S22. Here data "0" is transmitted for a period of 1.5 sec. When the TCF transmission ends, processing proceeds to step S23, at which the modem 19 is reset and processing is terminated.

If an image block is transmitted, the CPU 1 renders a YES decision at step S20, so that processing proceeds to step S24 at which the short training sequence transmission is instructed. The image data is transmitted at step S25.

As for processing on the receiving side in response to the above-described transmission, a call signal from the other party's facsimile 22 is detected by the NCU 20, whereupon a connection is made with the facsimile 22 via the telephone line 21. The NCU 20 is connected to the modem 19 and reception starts in accordance with the G3 procedure stipulated by the CCITT. Thereafter, when a transition is made to the image data reception phase, the MR or MH code data transmitted by the other party's facsimile is decoded by the secondary coding/decoding circuit 17 and the decoded data is stored in the memory 18. The primary coding/decoding circuit 16 reads in the data from the RAM 18, performs primary coding and stored the primary-coded data in the image memory 4. Next, in a case where received image data is recorded, the primary decoding circuit 14 reads the image data out of the image memory 4, subjects the data to primary decoding and sends the decoded data to the thermal head 13. The thermal head 13 is controlled to print the image on the recording paper 12, after which processing ends.

A changeover procedure for effecting training sequence changeover between a TCF signal and an image block on the receiving side will now be described in accordance with the flowcharts shown of FIGS. 6 and 7.

Figure 6:
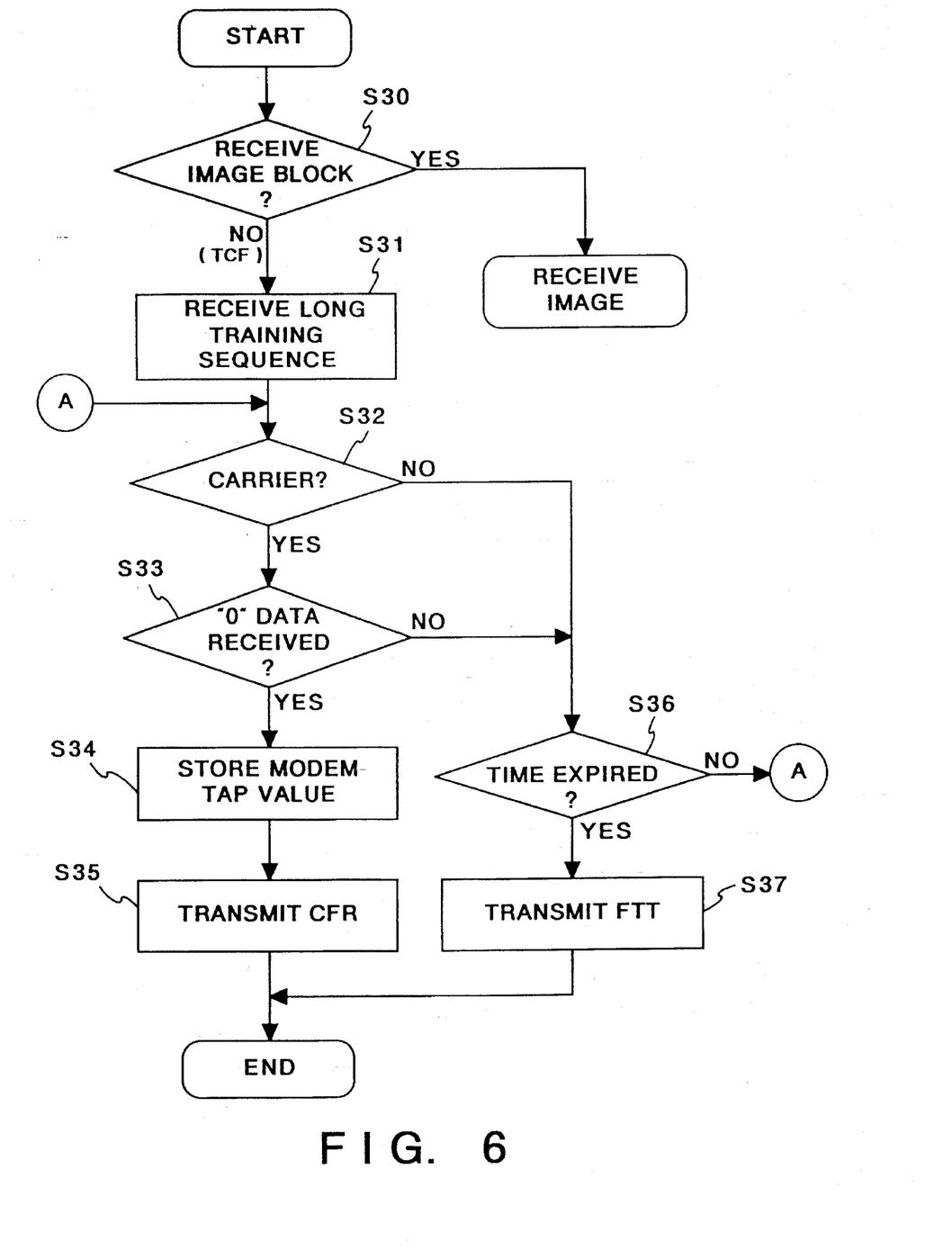

First, in a case where the TCF signal is received, a NO decision is rendered by the CPU 1 at step S30 in FIG. 6, as a result of which processing proceeds to step S31. Here the modem 19 is instructed to receive the long training sequence. Next, at step S32, the CPU 1 checks to see whether the other party's modem is outputting a carrier signal. If a carrier signal is being outputted, it is determined at step S33 whether the TCF signal ("0" data) is being transmitted. If a carrier signal and "0" data are not received from the modem within a predetermined period of time, a YES decision is rendered at step S36 and transmission of an FTT signal is instructed at step S37.

However, if the TCF signal is received (YES at step S33) within the predetermined time period, processing proceeds from step S33 to step S34, at which the CPU 1 stores the tap value of the modem to be stored in the RAM 3. This is followed by step S35, and transmission of the CFR signal is commanded. Processing is then terminated.

Figure 7:
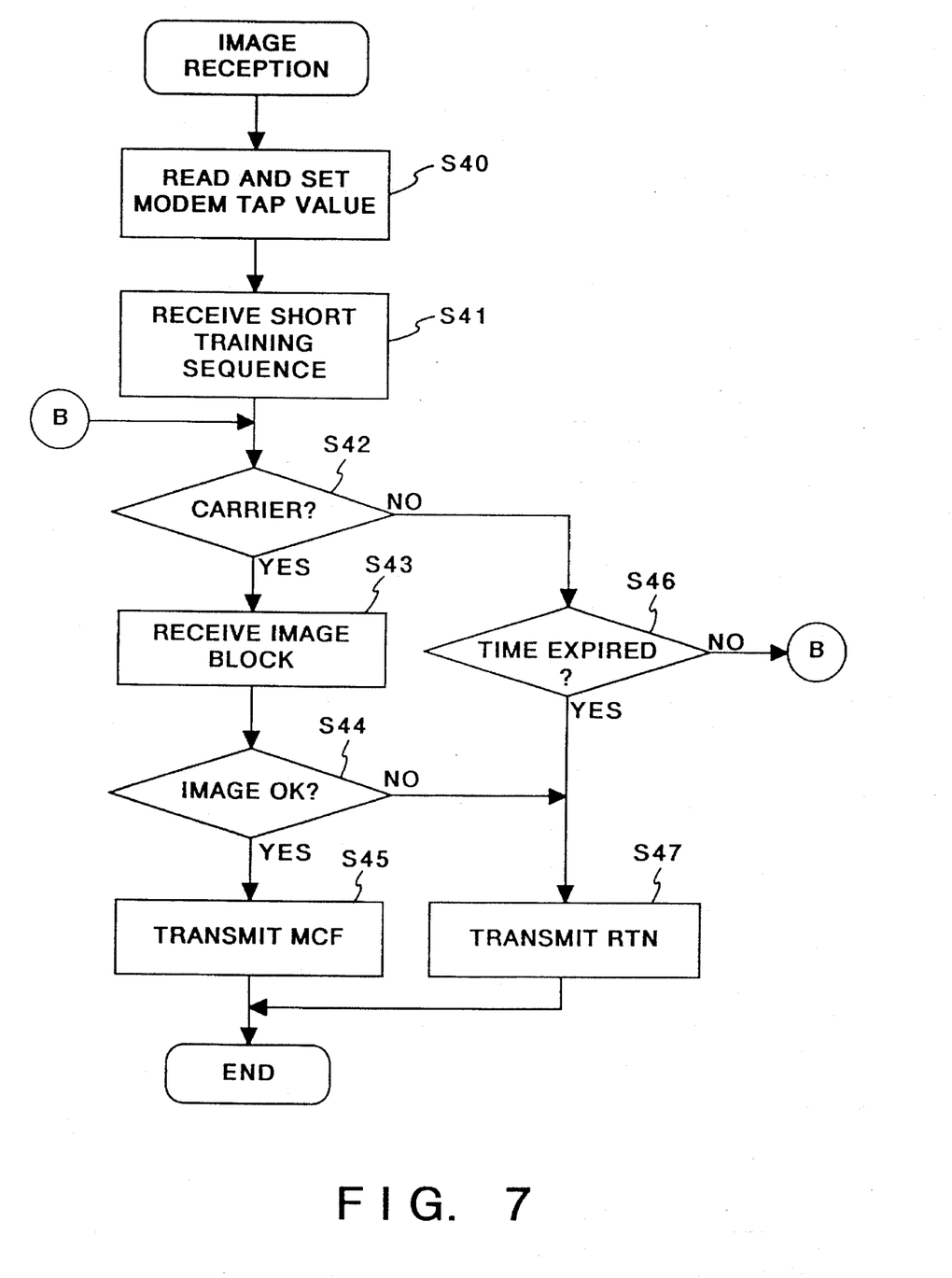

In a case where the image block is received, the tap value of the modem stored in the RAM 3 at reception of the TCF is read out and set at step S40 in FIG. 7. Next, at step S41, the modem 19 is instructed to receive the short training sequence, and it is determined at step S42 whether a carrier signal is received. If the carrier signal is detected within a predetermined period of time, the image block is received at step S43. When reception is completed, the quality of the received image is checked at step S44, and processing proceeds to step S45 if image quality is within fixed standards. Transmission of an MCR signal is instructed at step S45 and processing is terminated.

If a carrier signal is not detected within the predetermined time period at step S42, or if the image quality is found to be inferior at step S44, the CPU 1 advances processing from step S42 or step S44 to step S47, where transmission of an RTN signal is instructed.

In accordance with the present invention, the time required for communication can be shortened by changing over the training sequence.

Though changeover of the training sequence between the TCG signal and the image is performed in the G3 mode in the foregoing embodiment, the same results can be obtained even in a G3ECM mode.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus which sends information that includes at least a first kind of information including a signal for checking a communication state and a second kind of information including image data via a modem, comprising:

generation means for generating a training signal which is to adjust a receiving party's modem, wherein said generation means generates the training signal with a selected one of a long training sequence and a short training sequence; and changeover means for changing over to either the long training sequence or the short training sequence, by determining which of said kinds of information is to be sent after the training signal to the receiving party via the modem and changing over depending upon the kind of the information determined.

2. The apparatus according to claim 1, wherein said changeover means changes over to the long training sequence when the information to be sent is the signal for checking the communication state or when the information to be sent is an error retransmission frame.

3. A facsimile apparatus which performs communications via a modem comprising:

generation means for generating a training signal which is to adjust a receiving party's modem, wherein said generation means generates the training signal with a selected one of a long training sequence and a short training sequence; and changeover means for changing over to either the long training sequence or the short training sequence, by determining a kind of data which is to be sent to the receiving party via the modem and depending upon the result of the determination, wherein said changeover means determines whether the data is an image block or an error retransmission frame, and changes over to either the long training sequence or the short training sequence depending upon the result of the determination.

4. The facsimile apparatus according to claim 3, wherein said changeover means changes over to the long training sequence when the data information is the error retransmission frame and to the short training sequence when the data information is the image block.

5. A facsimile apparatus which performs communications via a modem comprising:

generation means for generating a training signal which is to adjust a receiving party's modem, wherein said generation means generates the training signal with a selected one of a long training sequence and a short training sequence; and changeover means for changing over to either the long training sequence or the short training sequence by determining a kind of data which is to be sent to the receiving party via the modem and depending upon the result of the determination, wherein said changeover means determines whether the data is a TCF signal or an image block, and changes over to the long training sequence or the short training sequence depending upon the result of the determination.

6. The facsimile apparatus according to claim 5, wherein said changeover means changes over to the long training sequence when the data information is the TCF signal and to the short training sequence when the data information is the image block.

7. A method of sending a training signal for adjusting a receiving party's modem in facsimile communications, comprising the steps of:

determining a kind of information which is to be sent after the training signal to the receiving party from information that includes at least a first kind of information including a signal for checking a communication state and a second kind of information including image data;

changing over a training signal transmission to either a long training sequence or a short training sequence depending upon the result of the determination; and sending information of the kind determined, after transmitting the training signal to the receiving party by the changed over training sequence.

8. The method according to claim 7, wherein said changeover step changes over to the long training sequence when the information to be sent is the signal for checking the communication state or when the information to be sent is an error retransmission frame.

9. A method of sending a training signal for adjusting a receiving party's modem facsimile communications, comprising the steps of;

determining a kind of the data which is to be sent to the receiving party;

changing over a training signal transmission to either a long training sequence or a short training sequence depending upon the result of the determination: and sending the data after transmitting the training signal to the receiving party by the changed over training sequence, wherein, at the step of determining the kind of data, it is determined whether the data is an image block or an error retransmission frame.

10. The method according to claim 9, wherein, at the step of changing over the training signal transmission, it is changed over to the short training sequence when the data is the image block and to the long training sequence when the data is the error retransmission frame.

11. A method of sending a training signal for adjusting a receiving party's modem in facsimile communications, comprising the steps of;

determining a kind of the data which is to be sent to the receiving party;

changing over a training signal transmission to either a long training sequence of a short training sequence depending upon the result of the determination; and sending the data after transmitting the training signal to the receiving party by the changed over training sequence, wherein, at the step of determining the kind of data, it is determined whether the data is a TCF signal or an image block.

12. The method according to claim 11, wherein, at the step of changing over the training signal transmission, it is changed over to the long training sequence when the data is the TCF signal and to the short training sequence when the data is the image block.

13. A method of adjusting a modem which sends first data information and second data information in facsimile communications, comprising the steps of:

determining whether data information to be sent after a training signal is the first data information or the second data information;

changing over a modem adjustment to either a long training sequence or a short training sequence depending upon the result of the determination; and sending the determined data information after adjusting the modem by the changed over training sequence, wherein the second data information is an error transmission frame of the first data information.

14. The method according to claim 13, wherein the first data information includes TCF signal data and the second data information includes image block data.

15. A method of adjusting a modem in facsimile communications, comprising the steps of:

determining a kind of communication data to be sent;

changing over a modem adjustment to either a long training sequence or a short training sequence depending upon the result of the determination; and sending the data after adjusting the modem by the changed over training sequence, wherein, at the step of determining the kind of communication data, it is determined whether the data is an image block or an error retransmission frame.

16. The method according to claim 15, wherein, at the step of changing over the modem adjustment, it is changed over to the short training sequence when the data is the image block and to the long training sequence when the data is the error retransmission frame.

17. A method of adjusting a modem in facsimile communications, comprising the steps of:

determining a kind of communication data to be sent;

changing over a modem adjustment to either a long training sequence or a short training sequence depending upon the result of the determination: and sending the data after adjusting the modem by the changed over training sequence, wherein at the step of determining the kind of communication data, it is determined whether the data is a TCF signal or an image block.

18. The method according to claim 17, wherein, at the step of changing over the modem adjustment, it is changed over to the long training sequence when the data is the TCF signal and to the short training sequence when the data is the image block.

19. A data transmission apparatus for transmitting first data information and second data information, comprising:

generation means for generating a training signal with a selected one of a long training sequence and a short training sequence; and changeover means for changing over to either the long training sequence or the short training sequence, by determining whether data information to be sent after the training signal is the first data information or the second data information depending upon the result of the determination, wherein the second data information is an error transmission frame of the first data information.

20. The apparatus according to claim 19, wherein the first data information includes TCF signal data and the second data information includes image block data.

* * * * *

UNITED STATES PATENT AND TRADEMARK OFFICE
CERTIFICATE OF CORRECTION

PATENT NO. : 5,513,208
DATED      : April 30, 1996
INVENTOR   : Toru Maeda

It is certified that error appears in the above-identified patent and that said Letters Patent is hereby corrected as shown below:

COLUMN 3

Line 67, "king" should read --kind--.

COLUMN 6

Line 58, "sequence by" should read --sequence, by--.

COLUMN 7

Line 17, "information" should read --information,--,
Line 26, "modem" should read --modem in--, and
Line 51, "of" should read --or--.

Signed and Sealed this

Twenty-fourth Day of September, 1996

Attest:

BRUCE LEHMAN

Attesting Officer​            Commissioner of Patents and Trademarks

UNITED STATES PATENT AND TRADEMARK OFFICE
CERTIFICATE OF CORRECTION

PATENT NO. : 5,513,208

DATED : April 30, 1996

INVENTOR : Toru Maeda

It is certified that error appears in the above-identified patent and that said Letters Patent is hereby corrected as shown below:

On the title page:

[56] References Cited

U.S. PATENT DOCUMENTS

"5,075,583" should read --5,075,783--.

Signed and Sealed this

Twenty-eighth Day of July, 1998

Attest:

BRUCE LEHMAN

Attesting Officer      Commissioner of Patents and Trademarks